Sept. 26, 1967  D. E. BURROUGH ET AL  3,343,347
WINDROWER TYPE HARVESTER

Filed March 17, 1965  3 Sheets-Sheet 1

INVENTORS
D. E. BURROUGH
R. H. FAIRBANK

BY John M. Nolan

ATTORNEY

Sept. 26, 1967 D. E. BURROUGH ETAL 3,343,347
WINDROWER TYPE HARVESTER
Filed March 17, 1965 3 Sheets-Sheet 2
FIG. 3
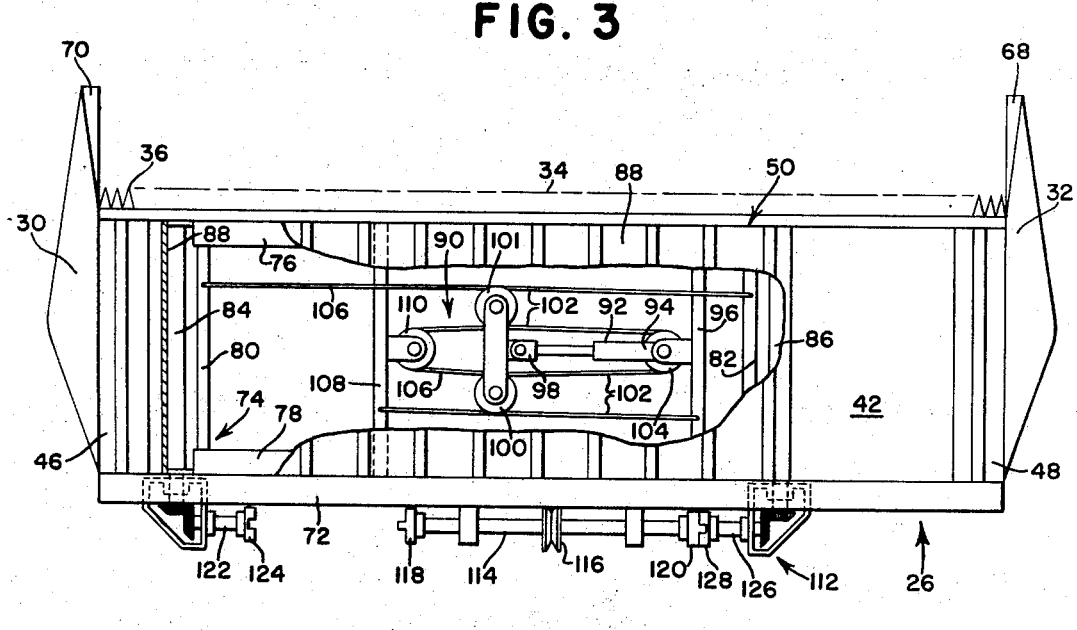
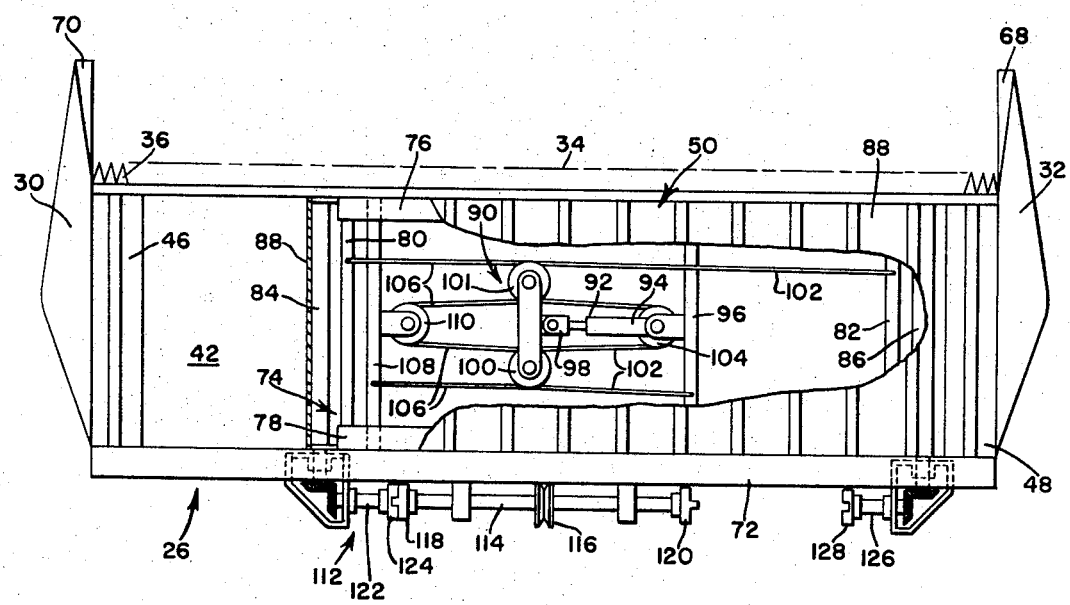
FIG. 4
INVENTORS
D. E. BURROUGH
R. H. FAIRBANK
BY John M. Nolan
ATTORNEY INVENTORS
D. E. BURROUGH
R. H. FAIRBANK
BY
John M. Nolan
ATTORNEY United States Patent Office 3,343,347
Patented Sept. 26, 1967

3,343,347
WINDROWER TYPE HARVESTER
Donald E. Burrough and Raymond H. Fairbank, Ottumwa, Iowa, assignors to Deere & Company, Moline, Ill., a corporation of Delaware
Filed Mar. 17, 1965, Ser. No. 440,515
4 Claims. (Cl. 56—23)

ABSTRACT OF THE DISCLOSURE

A self-propelled windrower having a draper-type platform including a transverse cutter bar, a main draper-type conveyor mounted behind the cutter bar for lateral shifting between alternate positions to provide alternate discharge areas respectively proximate to the opposite sides of the platform, a hydraulic cylinder operative to shift the conveyor, and a drive system for driving the conveyor so that it moves the crop to the discharge opening.

This invention relates to a harvester of the windrower type and more particularly to such a harvester having a shiftable and reversible conveyor for varying the location of the windrow relative to the machine.

A windrower advances over a field of standing crops, cutting the crops and forming them into windrows for subsequent pickup by a combine or the like. Conventionally, a windrower includes a platform or header, which has a cutting mechanism along its leading edge over which the cut crops are directed rearwardly to a conveyor, which discharges the crop in a windrow at one side of the platform or (in the case of a center-delivery type windrower), in an area between the opposite sides of the platform.

However, crop conditions vary widely, even in the same field, and, where the stand is relatively thin, a light or small windrow is formed. Generally, a combine of sufficient capacity to handle a normal windrow at normal speeds is used to pick up the windrow, and, where the windrow is light, some of the combine capacity is lost, decreasing the efficiency of the machine.

To overcome this objection, windrowers have been devised which are capable of laying a double windrow when the crop is thin by placing the windrows side by side or one on top of the other in succeeding turns around the field. Moreover, with the advent of the new, larger capacity combines, a double windrow is often desirable in all but very heavy stands of crop.

Previous windrowers capable of forming a double windrow have either required a deflector to prevent the placing of the windrow on top of uncut grain or have required an additional reversible conveyor for laterally delivering the windrow on top of the windrow formed on the previous turn around the field. However, such deflectors are subject to clogging and necessarily move in the uncut grain, and the added conveyor increases the size and cost of the machine. Moreover, with the newer and larger combines with wider pickups, it is no longer necessary that the two windrows be placed one on top of the other, or even side by side, as long as the combined widths of the two windrows and the space between them does not exceed the width of the combine pickup. In fact, the adjacent or spaced windrows are preferable since the grain in the windrows will dry more quickly.

The present invention overcomes the disadvantages of the previous windrowers by providing a windrower with a shiftable and reversible conveyor for selectively forming either a single or double windrow without the necessity of deflectors or additional conveyors and without interfering with or dropping the windrow on the standing crop.

Accordingly, the primary object of the present invention is to provide a windrower with a reversible conveyor, shiftable between alternate positions for selectively forming a single or a double windrow.

Another object is to provide such a windrower which will not interfere with or drop the windrow on the standing crop.

Another object of the invention is to provide such a machine which forms a double windrow having improved drying characteristics.

According to one embodiment of the invention, the windrower is provided with second and third fixed conveyors behind the cutting edge on opposite sides of the platform for spacing the windrow a relatively short distance from the standing crop and also for providing a space between the adjacent windrows when a double windrow is formed.

Another object is to provide a windrower which will cut the crop but will not deposit a windrow in the corners of the field where it is difficult for a combine to pick it up.

Another object is to provide means for shifting said conveyor and means for automatically driving the conveyor in the correct direction when the conveyor is in either shifted position.

Still another object is to provide such a windrower which is easily shifted for forming a single or double windrow and which is of simple and rugged construction and economical to manufacture and maintain.

These and other objects will become apparent from a consideration of the following detailed description and accompanying drawings wherein:

FIG. 3 is an enlarged plan view of the windrower platform with portions broken away and showing the conveyor positioned for right-hand windrow delivery.

FIG. 4 is a view similar to FIG. 3 but with the conveyor shifted to its alternate position for left-hand windrow delivery.

Figure 1:
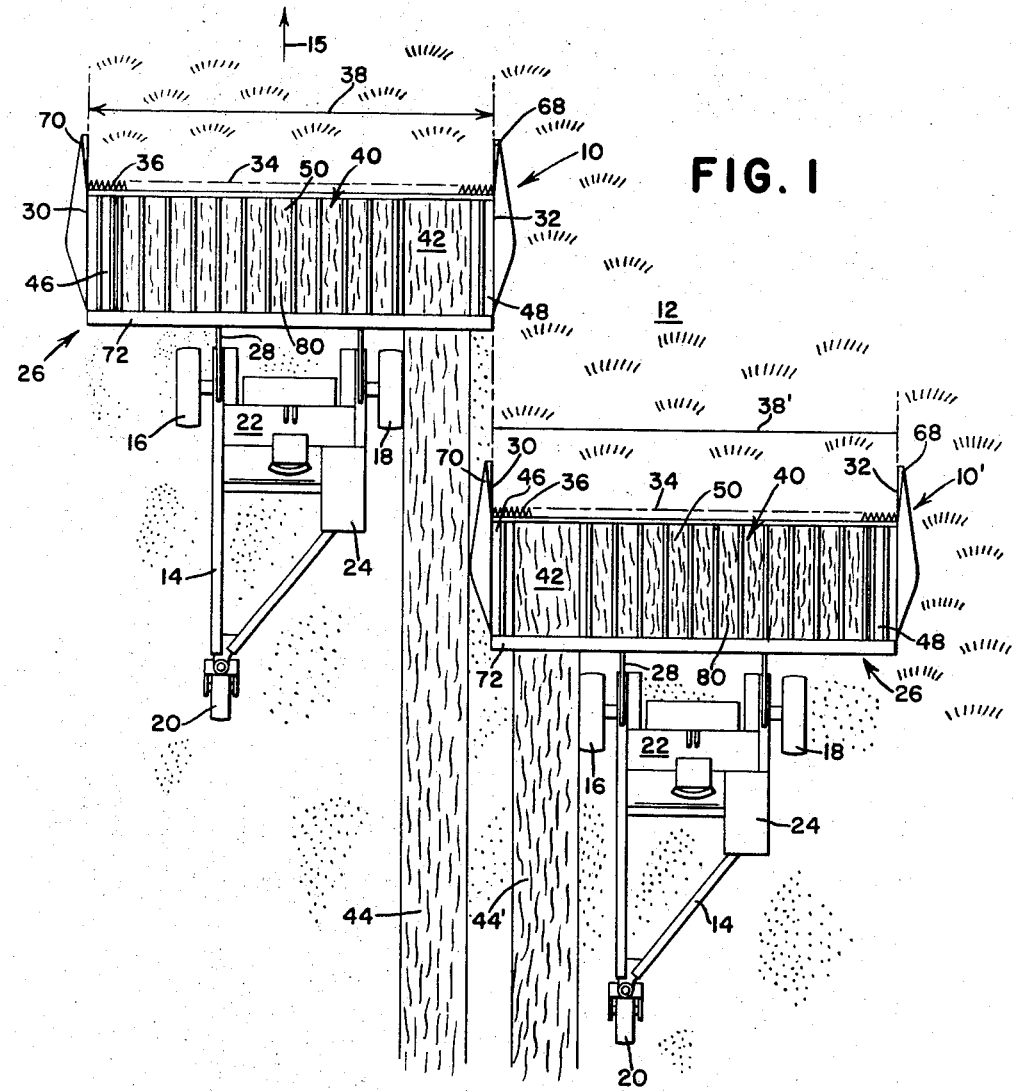
FIG. 1 is a somewhat schematic plan view representing two windrowers, or a single windrower in successive turns around the field, having their conveyors in opopsite alternate positions for forming a double windrow.

Referring now to FIG. 1, there are shown two windrowers, indicated generally by the numerals 10 and 10', advancing over a field of standing crops 12, the numeral 10 identifying the lead machine, and the numeral 10' identifying an identical offset and trailing machine or the same machine in a succeeding turn around the field.

Figure 2:
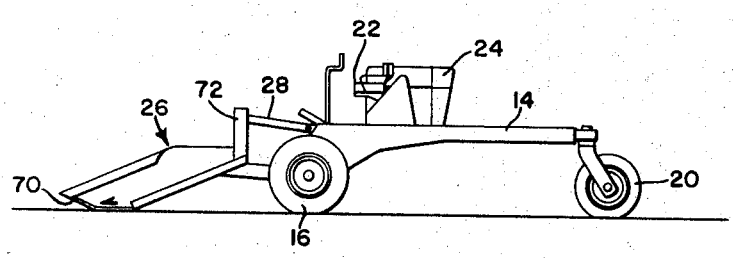
FIG. 2 is a side elevation view of the windrower.

As also shown in FIG. 2, each windrower includes a main frame 14 mounted for advance over the field in the direction of the arrow 15 on laterally spaced steerable right and left front drive wheels 16 and 18 respectively and a castering rear wheel 20. The frame 14 carries an operator's station 22 and a power source 24, such as an internal combustion engine, for driving the drive wheels 16 and 18.

A forwardly disposed platform or header 26 is also mounted on the frame 14 via a mounting means 28 and is vertically adjustable relative to the ground in the conventional manner. The platform 26 includes opposite lateral sides 30 and 32 and a transverse leading edge 34 extending between said sides. A cutting mechanism 36 extends along said leading edge and cuts a swath, indicated by the dimension line 38 for the windrower 10 and 38' for the windrowers 10', as the machine advances through the standing crop 12. The cut crop is directed rearwardly over the leading edge 34 to a laterally shiftable conveyor means 40, which extends behind a portion of the leading edge 36 and moves the crop laterally to either one of two discharge openings 42 behind the remaining portion of the leading edge. As the cut crop drops through the discharge area 42 on the windrowers 10 and 10′, it is formed into windrows 44 and 44′ respectively.

The use of such expressions as "forward," "rear," "right," "left," "upwardly," "downwardly," etc. is not to be construed as limiting the invention, such expressions being merely terms of convenience to more clearly describe the invention.

In the embodiment shown in FIG. 1, the conveyor means 40 includes first and second, relatively short, auxiliary conveyors 46 and 48, adjacent to the lateral sides 30 and 32 respectively, for moving the crop laterally inwardly of the platform. The conveyor means 40 also includes a reversible main conveyor 50 which is transversely shiftable on the platform between alternate positions in which it moves the cut crop to the discharge area 42. On the windrower 10, the main conveyor 50 is in its first position in which it is adjacent to and fed by the left auxiliary conveyor 46. In this position, the main conveyor 50 moves the crop from left to right to the discharge area 42, which is located on the right side of the platform 26 between the main conveyor 50 and the auxiliary conveyor 48, forming the windrow 44 to the right of the right drive wheel 18. On the windrower 10′, the main conveyor 50 is shifted to its second position in which it is adjacent to and fed by the right auxiliary conveyor 48. In this position, the main conveyor moves the crop from right to left to the discharge area 42, which forms the windrow 44′ to the left of the left drive wheel 16. As is apparent from the drawings, the windrows 44 and 44′ are spaced by a distance equal to the combined transverse dimensions of the auxiliary conveyors 44 and 48.

Figure 5:
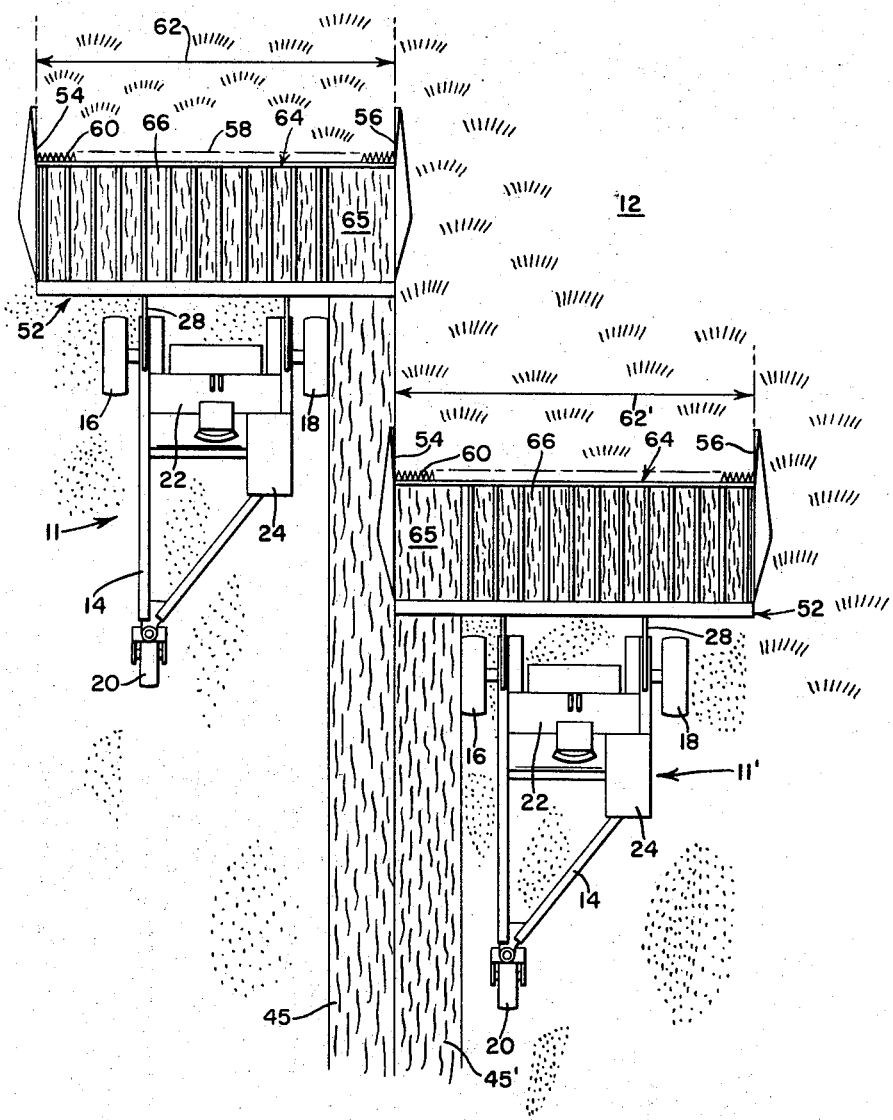
FIG. 5 is a view similar to FIG. 1 but showing a slightly different embodiment of the windrower.

In the embodiment shown in FIG. 5, the windrowers 11 and 11′ are identical to the windrowers 10 and 10′ shown in FIG. 1 except that the auxiliary conveyors 46 and 48 are omitted. A platform 52 is again mounted on the main frame 14 via mounting means 28 and includes opposite lateral sides 54 and 56 and a transverse leading edge 58 extending between said sides. A cutting mechanism 60 extend along the leading edge 58 and cuts a swath, indicated by the dimension line 62 for the windrower 11 and 62′ for the windrower 11′, as the machine advances through the standing crop 12. The cut crop is directed rearwardly over the leading edge 58 to a conveyor means 64, which extends behind a portion of the leading edge 58 and moves the crops laterally to a discharge area 65 behind the remaining portion of the leading edge. As the cut crop drops through the discharge area 65 on the windrowers 11 and 11′, it is formed into windrows 45 and 45′ respectively.

The conveyor means 64 comprises a reversible main conveyor 66 which is transversely shiftable on the platform 52 between a first position, where it extends between the lateral side 54 and the discharge area 65 as shown on the windrower 11 in FIG. 5, and a second position, in which it extends between the lateral side 56 and the discharge area 65 as shown on the windrower 11′ in FIG. 5. In the first position, the main conveyor 66 moves the crop laterally from left to right to the discharge area 65, and, in the second position, it moves the crop from right to left to the discharge area. As is apparent from the drawings, the discharge area 65 is adjacent the lateral side 56 in the first position and forms a windrow 44 to the right of the right drive wheel 18. In the second position, the discharge area 65 is adjacent to the lateral side 54 and forms a windrow 44′ to the left of the left drive wheel 16. Thus the windrows 44 and 44′ are closely adjacent.

A more detailed construction of the platform 26, shown in FIG. 1, is shown in FIG. 3 and FIG. 4. The platform includes opposite lateral sides 30 and 32, a transverse leading edge 34 extending between said lateral sides, and a cutting mechanism 36 extending along said leading edge. Right and left crop dividers 68 and 70 respectively extend forwardly from the leading edge 34 at the lateral sides 32 and 30 respectively and define the swaths 38 and 38′. A rear platform member 72 extends between the lateral sides 30 and 32 parallel to and rearwardly spaced from the leading edge 34. The conveyor means 40 includes the auxiliary conveyors 46 and 48, which are shown as a pair of belt-type conveyors extending between the leading edge 34 and the rear platform member 72, the top surface of each belt being driven inwardly toward the center of the platform via drive means (not shown) connected to the power source 24.

The main conveyor 50 includes a main conveyor frame 74, which extends upwardly and rearwardly from the cutting mechanism 36 to the rear platform member 72 and is laterally shiftable on the platform 26. The frame 74 has a front transverse member 76 mounted on the cutting mechanism 36 for lateral sliding movement thereon, a rear transverse member 78 mounted on the rear platform member 72 for lateral sliding movement relative thereto, and a pair of parallel, laterally spaced, frame members 80 and 82, which extend between the front and rear transverse members 76 and 78. A pair of fore-and-aft extending, tranversely spaced, parallel rollers 84 and 86 are journaled at opposite ends on the front and rear frame members 76 and 78, and an endless canvas 88 is trained around said rollers for movement therewith. The canvas moves in a lateral direction and, like the frame 74, extends upwardly and rearwardly from the cutting mechanism 36 to the rear platform member 72.

The main conveyor 50 is laterally shiftable between a first position, in which the roller 84 is adjacent the auxiliary conveyor 46 and the discharge area 42 is on the right side of the platform, as shown in FIG. 3, and a second position, in which the roller 86 is adjacent the conveyor 48 and the discharge area 42 is on the left side of the platform as shown in FIG. 4. The main conveyor 50 is shifted by a shifting means 90, which includes a hydraulic ram 92, having a cylinder 94 mounted on a fixed platform member 96 and a piston 98 which carries a pair of pulleys 100 and 101. A cable 102 has one end attached to the fixed platform member 96 and is trained around the pulley 100, a pulley 104 attached to the platform member 96, the pulley 101, and has its other end attached to the frame member 82. When the piston 98 is extended via hydraulic control means (not shown) actuated by the operator, from the position shown in FIG. 4 to the position shown in FIG. 3, the block and tackle mechanism formed by the cable and pulleys multiples the movement of the piston in a four-to-one ratio, and the cable 102 pulls the conveyor 50 via the frame member 82 to the first position shown in FIG. 3.

A second cable 106 similarly has one end attached to a fixed platform member 108 and is trained around the pulley 100, a pulley 110 mounted on the frame member 108, and the pulley 101, the other end of the cable 106 being attached to the frame member 80. When the piston is retracted, the mechanism again multiplies the movement of the piston in a four-to-one ratio and moves the conveyor via the frame member 80 to the position shown in FIG. 4.

The conveyor is driven by a drive means 112, which includes a transverse drive shaft 114, journaled on the platform member 72, and a drive sheave 116, mounted on the drive shaft 114 and operably connected to the power source 24 for rotating the drive shaft. A pair of clutch elements 118 and 120 are respectively mounted on opposite ends of the drive shaft 114. A driven shaft 122 is journaled on the frame 74 coaxial to the shaft 114 and carries a clutch element 124 at one end, the other end being operably connected to the roller 84 for rotation therewith. A second driven shaft 126 is also journaled on the frame 74 coaxial to the shaft 114 and carries a clutch element 128 at one end, the other end of the shaft being operably connected to the roller 86 for rotation therewith. When the conveyor 50 is shifted to the first position, as shown in FIG. 3, the clutch element 128 meshes with the clutch element 120, and the drive means 112 rotates the roller 86 in such a direction that the top surface of the canvas moves toward the discharge area 42 (to the right in FIG. 3). When the conveyor 50 is shifted to its second position, as shown in FIG. 4, the clutch elements 120 and 128 disengage, and, after the shifting is accomplished, the clutch elements 118 and 124 mesh to connect the drive means 112 to the roller 84. While the drive shaft 114 is rotated in the same direction, the roller 84 is rotated in the opposite direction from the rotation of the roller 86 in the first position so that the top surface of the canvas 88 again moves toward the discharge area 42 (to the left in FIG. 4). Thus, the conveyor 50 is automatically reversed and driven in the correct direction when the conveyor is shifted.

In operation, the windrower 10 is advanced through a field of standing crops, cutting a swath 38 and forming the crop into a windrow 44. If a single windrow is to be formed, the machine can be operated with the main conveyor 50 in either position, the alternate windrow positions permitting the movement around the field in either direction, since the windrow can be spaced from the fence line in either direction. At the corners of the field, in areas which are inaccessible to a combine, the conveyor can be shifted to an intermediate position in which the drive means 112 is disconnected from both driven shafts 122 and 126, stopping the conveyor 50. The cut crop will then collect on the conveyor until the windrower reaches a point easily accessible to a combine, and the drive means 112 is again engaged to move the crop through the discharge area 42.

When a double windrow is desired, the conveyor 50 on the windrower 10 is shifted to the first position for forming the windrow 44 on the right side of the platform if the field is being cut in the direction shown in FIG. 1. The trailing windrower 10′, or the windrower 10 on the next turn around the field, then cuts an adjacent swath 38′, and the conveyor 50 is shifted to its second position for forming the windrow 44′ on the left side of the platform. The windrows 44 and 44′ are thus adjacent and can be both picked up on one trip of the combine.

If a relatively wide combine pickup is utilized, the embodiment shown in FIG. 1 can be utilized, the windrows 44 and 44′ being spaced a relatively short distance apart. This spacing results in improved drying characteristics for the crop, and also prevents a crop divider, 68 or 70, from moving in the preceding windrow and recirculating a portion of the windrowed crop through the windrower. The spacing provided by the embodiment shown in FIG. 1 also prevents any portion of the harvested crop from being deposited on the uncut crop 12.

However, if a wider combine pickup is not available, the embodiment of the windrower shown in FIG. 5 can be utilized to place the second windrow closely adjacent to the first windrow. In addition, although the embodiment shown in FIG. 5 has some disadvantages, it is more economical to manufacture.

Other features and advantages of the present invention will occur to those skilled in the art, as will many modifications and alterations in the preferred embodiment of the invention as described herein, all of which may be achieved without departing from the spirit and scope of the invention.

What is claimed is:

1. A crop harvester comprising: a main frame mounted for advance over a field; a forwardly disposed platform carried by said frame and having first and second opposite sides and a transverse cutter bar extending between said sides along the leading edge over which the crops move rearwardly; a first relatively short transverse crop-receiving conveyor carried by the platform behind a portion of the cutter bar adjacent the first side; a second relatively short transverse crop-receiving conveyor carried by the platform behind a second portion of the cutter bar adjacent the second side; drive means operably connected to said first and second conveyors for moving the crop inwardly toward the opposite sides; a third transverse crop-receiving main conveyor carried by the platform behind part of a third portion of the cutter bar which extends between said first and second portions, the remaining area behind the third cutter bar portion forming a discharge area, means for transversely shifting the third conveyor between a first position wherein it extends between the first conveyor and the discharge area and a second position wherein it extends between the second conveyor and the discharge area; and reversible drive means operably connected to said third conveyor in said first and second positions for moving the crop from the adjacent conveyor to the discharge area in either conveyor position.

2. In a windrower type harvester having a forwardly disposed platform with first and second opposite lateral sides, and a transverse leading edge extending between said sides and over which the crops are directed rearwardly, the improvement comprising: first and second auxiliary conveyor means mounted on the platform behind the leading edge respectively adjacent to the first and second sides and respectively operative to shift the crop laterally toward the center of the platform, and a main conveyor means mounted on the platform between the auxiliary conveyor means and shiftable thereon between a first position wherein it is adjacent to and feedable by the first auxiliary conveyor and operative to move the crop toward the second side, and a second position wherein it is adjacent to and feedable by the second auxiliary conveyor and operative to move the crop toward the first side.

3. The invention defined in claim 2 wherein the three conveyor means are transverse draper-type conveyors inclined upwardly and rearwardly from the leading edge and substantially coextensive in a fore-and-aft direction, the transverse length of the main conveyor means being less than the distance between the auxiliary conveyor means whereby the main conveyor means is transversely spaced from the second auxiliary conveyor means in said first position to form a discharge area therebetween and is transversely spaced from the first auxiliary conveyor means in said second position to form a discharge area therebetween.

4. The invention defined in claim 3 and including a hydraulically actuated shifting means operative between the platform and the main conveyor means for shifting the conveyor means between its alternate positions.

References Cited

UNITED STATES PATENTS

| | | | |
|---|---|---|---|
| 296,120 | 4/1884 | Bovee | 56—187 |
| 306,151 | 10/1884 | Harker | 56—187 |
| 3,214,002 | 10/1965 | Kirkpatrick et al. | 56—181 |

ABRAHAM G. STONE, *Primary Examiner.*

ANTONIO F. GUIDA, *Examiner.*